United States Patent
Yokoi et al.

(10) Patent No.: US 7,004,009 B2
(45) Date of Patent: Feb. 28, 2006

(54) KNOCKING SENSOR FOR INTERNAL COMBUSTION ENGINE AND MANUFACTURING METHOD OF THE SAME

(75) Inventors: Akito Yokoi, Tokyo (JP); Harumasa Shibata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/956,155

(22) Filed: Oct. 4, 2004

(65) Prior Publication Data

US 2005/0262925 A1  Dec. 1, 2005

(30) Foreign Application Priority Data

May 26, 2004 (JP) ............................ P2004-156418

(51) Int. Cl.
*G01M 15/00* (2006.01)
(52) U.S. Cl. ..................................... 73/35.11; 73/117.3
(58) Field of Classification Search ............... 73/35.01, 73/35.03, 35.06, 35.07, 35.09, 35.11, 35.12, 73/35.13, 116, 117.2, 117.3, 118.1, 119 R
See application file for complete search history.

(56) References Cited

U.S. PATENT DOCUMENTS

| | | | | |
|---|---|---|---|---|
| 4,869,095 A | * | 9/1989 | Komurasaki | 73/35.11 |
| 4,944,179 A | * | 7/1990 | Komurasaki | 73/35.11 |
| 4,945,755 A | * | 8/1990 | Komurasaki | 73/35.11 |
| 4,949,571 A | * | 8/1990 | Komurasaki | 73/514.16 |
| 4,961,338 A | * | 10/1990 | Komurasaki | 310/329 |
| 4,964,294 A | * | 10/1990 | Kawajiri et al. | 73/35.11 |
| 4,967,114 A | * | 10/1990 | Komurasaki et al. | 310/329 |
| 4,978,883 A | * | 12/1990 | Komurasaki | 310/329 |
| 5,125,263 A | * | 6/1992 | Komurasaki et al. | 73/35.11 |
| 5,144,837 A | * | 9/1992 | Komurasaki et al. | 73/35.11 |
| 5,150,606 A | * | 9/1992 | Komurasaki | 73/35.09 |
| 5,939,616 A | * | 8/1999 | Ito et al. | 73/35.11 |
| 5,965,804 A | * | 10/1999 | Sakamoto | 73/35.11 |
| 6,279,381 B1 | * | 8/2001 | Brammer et al. | 73/35.11 |
| 6,752,005 B1 | * | 6/2004 | Harada et al. | 73/35.13 |
| 6,786,078 B1 | * | 9/2004 | Brammer | 73/35.11 |
| 6,923,041 B1 | * | 8/2005 | Harada et al. | 73/35.07 |
| 2003/0121312 A1 | * | 7/2003 | Harada et al. | 73/35.07 |
| 2003/0200790 A1 | * | 10/2003 | Harada et al. | 73/35.11 |
| 2004/0011135 A1 | * | 1/2004 | Brammer | 73/652 |
| 2004/0187559 A1 | * | 9/2004 | Yokoi | 73/35.01 |
| 2004/0250603 A1 | * | 12/2004 | Harada et al. | 73/35.11 |

FOREIGN PATENT DOCUMENTS

| JP | 2001-4476 A | 1/2001 |
|---|---|---|
| JP | 2002-55013 A | 2/2002 |

* cited by examiner

*Primary Examiner*—Eric S. McCall
(74) *Attorney, Agent, or Firm*—Sughrue Mion, PLLC

(57) ABSTRACT

There is provided a knocking sensor for an internal combustion engine improved so that electrical damage of a terminal plate in an annular combination member is more certainly prevented. Only two communicating passages separate from each other by substantially 180 degrees are formed in an annular weight of the annular combination member, and resin is filled into an annular space at an inner periphery of the annular combination member by using these two communicating passages. When a passage axis where the two communicating passages are positioned is made substantially orthogonal to a resin injection direction, the resin can be more effectively filled into the annular space.

8 Claims, 6 Drawing Sheets

KNOCKING SENSOR FOR INTERNAL COMBUSTION ENGINE AND MANUFACTURING METHOD OF THE SAME

BACKGROUND OF THE INVENTION

1. Field of the Invention

The present invention relates to a knocking sensor for an internal combustion engine which is attached to the internal combustion engine and detects its knocking, and a manufacturing method of the same.

2. Description of the Related Art

As a knocking sensor for an internal combustion engine, a knocking sensor called a non-resonant type is disclosed in JP-A-2002-55013 (related art 1). This non-resonant type knocking sensor includes a base member having a cylindrical part and a flange part formed at its one end, a bolt is inserted into a center hole of the cylindrical part of the base member, and this bolt is attached to the internal combustion engine, so that the knocking of the internal combustion engine is detected.

In this kind of knocking sensor, an annular combination member including an annular piezoelectric element, an annular weight, a pair of annular terminal plates combined with these, and a pair of annular insulating sheets is disposed at the outer periphery of the cylindrical part, and this annular combination member is pressed to the flange part of the base member by a pressure fastening member. The annular weight gives moment of inertia based on the vibration generated in the internal combustion engine to the piezoelectric element. The piezoelectric element outputs an electric signal generated by the vibration according to the knocking of the internal combustion engine, and the electric signal is extracted from the terminal plates.

In the knocking sensor disclosed in the related art 1, electrogalvanizing is applied to the base member, and when whisker generated from the plating layer comes in contact with the pair of terminal plates, the terminal plates are electrically short-circuited, and there is a problem that the electric signal can not be extracted. Thus, a resin mold member is filled in an annular space between the annular combination member and the cylindrical part.

JP-A-2001-4476 (related art 2) also discloses a similar knocking sensor, and in the knocking sensor disclosed in the publication of JP-A-2001-4476, an insulating sleeve is disposed in an annular space between an annular combination body and a cylindrical part of a base member.

In the related art 1, since the resin mold member is filled in the annular space, four grooves are provided in the annular weight at intervals of 90 degrees. In order to generate sufficient moment of inertia, it is desirable that the weight of the annular weight is as large as possible. Thus, it is necessary to make the sectional areas of the four grooves as small as possible. However, when the sectional areas of the grooves are made small, passing areas of the resin mold filled through the grooves are lessened, so that it becomes difficult to send a sufficient amount of resin into the annular space.

In the related art 2, as the result of the addition of the insulating sleeve, not only the number of necessary parts is increased, but also the assembling operation of the insulating sleeve is also required to be performed, and therefore, the manufacture cost is increased.

SUMMARY OF THE INVENTION

The invention provides an improved knocking sensor for an internal combustion engine which can solve the problems as stated above.

Besides, the invention provides a manufacturing method of an improved knocking sensor for an internal combustion engine which can solve the problems as stated above.

A knocking sensor for an internal combustion engine according to the invention includes a base member, an annular combination member, a pressure fastening member, and a resin mold member. The base member has a cylindrical part and a flange part formed at its one end. The annular combination member has at least an annular piezoelectric element and an annular weight, and disposed at an outer periphery of the cylindrical part of the base member. The pressure fastening member is for pressure-fastening the annular combination member to the flange part of the base member. The resin mold member covers the annular combination member and the pressure fastening member. In the knocking sensor, an annular space is formed between the annular combination member and the cylindrical part of the base member, and the resin mold member is filled also in the annular space. Also, in the knocking sensor, the annular weight has only two communicating passages extending in its diameter direction, and the two communicating passages are formed at positions separate from each other by substantially 180 degrees with respect to a center axis of the annular weight, and each of the two communicating passages connects an outer periphery of the annular weight and the annular space to make passages for filling the resin material into the annular space.

Besides, according to the invention, a manufacturing method of a knocking sensor for an internal combustion engine is proposed. In the manufacturing method, the knocking sensor includes a base member, an annular combination member, a pressure fastening member and a resin mold member. The base member has a cylindrical part and a flange part integrally formed at its one end. The annular combination member has at least an annular piezoelectric element and an annular weight, and disposed at an outer periphery of the cylindrical part of the base member. The pressure fastening member is screwed onto the cylindrical part and is for pressure-fastening the annular combination member to the flange part of the base member. The resin mold member covers the annular combination member and the pressure fastening member. In the knocking sensor, an annular space filled with the resin mold member is formed between the annular combination member and the cylindrical part of the base member, and the annular weight has only two communicating passages extending in its diameter direction. Also, in the knocking sensor, each of the communicating passages connects an outer periphery of the annular weight and the annular space to make passages for filling the resin material into the annular space. In the manufacturing method, when the pressure fastening member is screwed onto the cylindrical part, a jig for surrounding the annular combination member is used. The jig is provided with two slide pins, and the slide pins are fitted in the respective communicating passages of the annular weight to lock the annular weight.

In the knocking sensor for the internal combustion engine according to the invention, the annular weight of the annular combination member has only the two communicating passages extending in its diameter direction, and the communicating passages are formed at the positions separate from each other by substantially 180 degrees with respect to the center axis of the annular weight, each of the two communicating passages connects the outer periphery of the annular weight and the annular space to make the passages for filling the resin material into the annular space. Accordingly, in the case where the weight of the annular weight is set to a specified value, the sectional area of each of the communicating passages can be made large as compared with a conventional case where four grooves are formed, filling of the resin material into the annular space is facilitated, a sufficient amount of resin mold member is filled in the annular space, and generation of electrical failure by whisker from a plating layer can be effectively prevented. Besides, since the respective communicating passages are formed at the positions separate from each other by substantially 180 degrees with respect to the center axis of the annular weight, the resin mold can be effectively injected into the annular space from both sides separate from each other by substantially 180 degrees.

Besides, in the manufacturing method of the knocking sensor for the internal combustion engine according to the invention, when the pressure fastening member is screwed onto the cylindrical part, the jig for surrounding the annular combination member is used, the jig is provided with the two slide pins, and the slide pins are fitted in the respective communicating passages of the annular weight to lock the annular weight. Accordingly, also when the pressure fastening member is screwed onto the cylindrical part, the two communicating passages can be held at a specified position, the resin mold member is effectively filled into the annular space from the communicating passages positioned at the specified position, and generation of electrical failure by the whisker from the plating layer can be effectively prevented.

BRIEF DESCRIPTION OF THE DRAWINGS

FIGS. 3A and 3B show an annular weight in the embodiment 1, in which FIG. 3(a) is a top view and FIG. 3(b) is a side view in a direction of an arrow B;

DETAILED DESCRIPTION OF THE INVENTION

Some embodiments of the invention will be described below with reference to the drawings.

Embodiment 1

Figure 1:
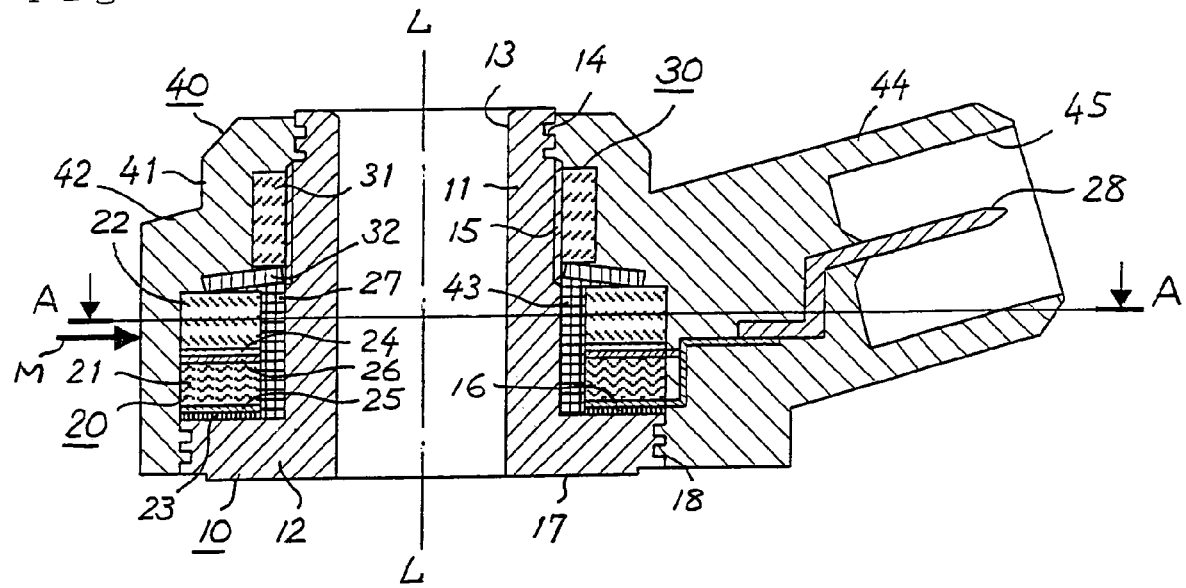
FIG. 1 is a longitudinal sectional view showing embodiment 1 of a knocking sensor for an internal combustion engine according to the invention.
Figure 2:
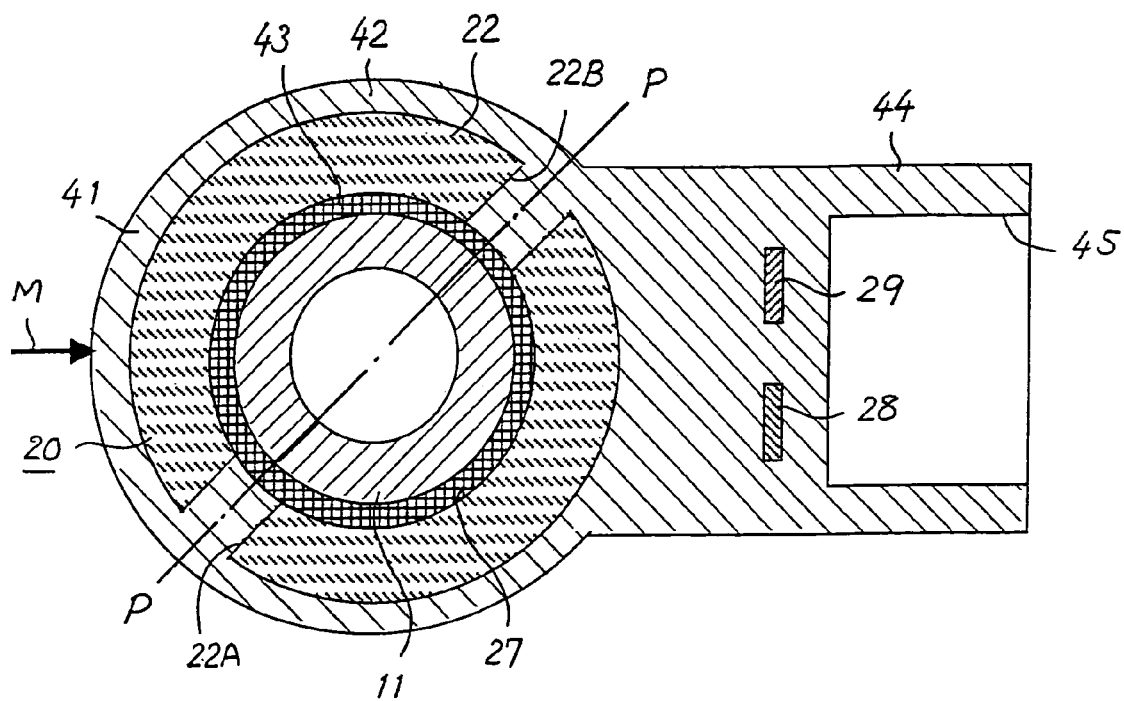
FIG. 2 is a sectional view taken along line A—A of FIG. 1.
Figure 3:
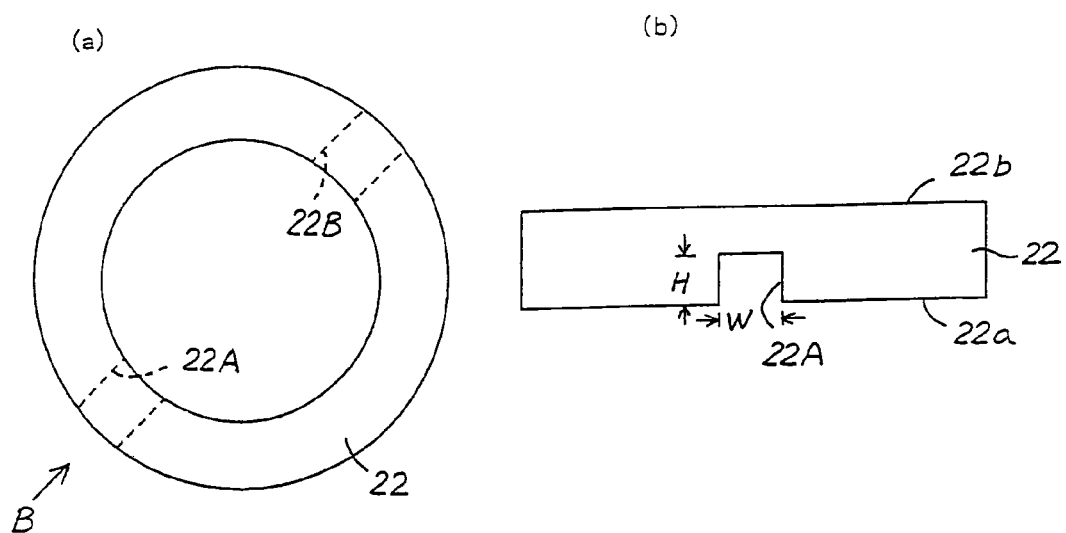

FIG. 1 is a longitudinal sectional view showing embodiment 1 of a knocking sensor for an internal combustion engine according to the invention, FIG. 2 is a sectional view taken along line A—A of FIG. 1, and FIGS. 3(a) and 3(b) show an annular weight in the embodiment 1 in which FIG. 3(a) is a top view of the annular weight, and FIG. 3(b) is a side view in a direction of an arrow B of FIG. 3(a). The embodiment 1 will be described with reference to these drawings.

The knocking sensor for the internal combustion engine of the embodiment 1 is a non-resonant type knocking sensor. Knocking sensors include a resonant type knocking sensor and a non-resonant type knocking sensor. The resonant type knocking sensor has such a characteristic that the output becomes maximum at a resonant point where a vibration frequency generated by knocking coincides with a natural frequency of the knocking sensor. Since the resonant type knocking sensor is required to make the resonant frequency coincident with the knocking frequency of the internal combustion engine, it can be used for only a selected internal combustion engine.

On the other hand, the non-resonant type knocking sensor does not have a resonant frequency such as that of the resonant type knocking sensor, and has a substantially flat vibration characteristic in a wide vibration detection band. The non-resonant type knocking sensor is combined with a band filter having a narrow passing band width. This band filter is constructed to allow only an electric signal corresponding to the knocking vibration frequency of the internal combustion engine to pass through, and knocking of the internal combustion engine can be detected on the basis of the electric signal having passed through the band filter. When the passing vibration frequency of the band filter is changed according to the knocking vibration frequency of the internal combustion engine, the non-resonant type knocking sensor can detect knocking of various internal combustion engines having different knocking vibration frequencies, and its versatility is improved.

The knocking sensor of the embodiment 1 is of the non-resonant type, and is fixed to the internal combustion engine by using a bolt. The knocking sensor of the embodiment 1 includes a base member 10, an annular combination member 20, a pressure fastening member 30 and a resin mold member 40.

The base member 10 includes a cylindrical part 11 and a flange part 12. These are made of iron members and are formed to be integral with each other. The cylindrical part 11 is specifically constructed of a cylinder, and extends in the vertical direction in FIG. 1. The flange part 12 is formed integrally with the cylindrical part 11 at one end of the cylindrical part 11, specifically at the lower end thereof in FIG. 1. The base member 10 has a center hole 13, a not-shown attachment bolt is inserted in the center hole 13, and the base member 10 is fixed to the not-shown internal combustion engine by this attachment bolt. The center hole 13 passes through the center parts of the cylindrical part 11 and the flange part 12. An axial line L—L of the center hole 13 extends in the vertical direction in FIG. 1. A plating layer of electrogalvanizing or the like is formed on the surface of the base member 10.

Plural engagement grooves 14 are formed at an upper end of an outer periphery of the cylindrical part 11, and a screw part 15 is formed under the engagement grooves 14. The engagement grooves 14 are, for example, annular grooves, and include two adjacent annular grooves. The screw part 15 is formed so that a pressure nut 31 of the pressure fastening member 30 is screwed in.

The flange part 12 is an annular plate, and includes a pressure contacting surface 16 at its upper surface and an attachment surface 17 at its lower surface. The annular combination member 20 is pressed to the pressure contacting surface 16. The attachment surface 17 is attached to a specified portion of a body of the not-shown internal combustion engine. Plural engagement grooves 18 are formed on the outer periphery of the flange part 12. The engagement grooves 18 are, for example, annular grooves, and includes two adjacent annular grooves.

The annular combination member 20 includes an annular piezoelectric element 21 and an annular weight 22. The annular weight 22 intensifies the vibration from the internal combustion engine and gives it to the piezoelectric element 21. The annular piezoelectric element 21 receives the intensified vibration from the annular weight 22 and outputs an electric signal corresponding to the vibration.

The annular combination member 20 further includes an annular first insulating sheet 23, an annular second insulating sheet 24, an annular first terminal plate 25, and an annular second terminal plate 26. The annular piezoelectric element 21, the annular weight 22, the annular first insulating sheet 23, the annular second insulating sheet 24, the annular first terminal plate 25, and the annular second terminal plate 26 have substantially equal outer diameters and inner diameters, and are stacked on each other along the axial line L—L and constitute the annular combination member 20. The annular combination member 20 is disposed at the outer periphery of the cylindrical part 11 to be coaxial therewith while its center axis coincides with the axial line L—L.

In the annular combination member 20, the annular first insulating sheet 23 is disposed at the lowest position in FIG. 1 and is contacted to the pressure contacting surface 16 of the flange part 12. The annular first terminal plate 25 is stacked on the annular first insulating sheet 23, and the piezoelectric element 21 is stacked on the annular first terminal plate 25. The annular first terminal plate 25 is held between the annular first insulating sheet 23 and the piezoelectric element 21, is electrically connected to the piezoelectric element 21, and constitutes a first terminal of the piezoelectric element 21.

The annular second terminal plate 26 is stacked on the piezoelectric element 21, the annular second insulating sheet 24 is stacked on the annular second terminal plate 26, and the annular weight 22 is stacked on the annular second insulating sheet 24. The annular second terminal plate 26 is held between the annular second insulating sheet 24 and the piezoelectric element 21, is electrically connected to the piezoelectric element 21, and constitutes a second terminal of the piezoelectric element 21.

The annular combination member 20 is disposed at the outer periphery of the cylindrical part 11 of the base member 10, and an annular space 27 is formed between the inner peripheral surface of the annular combination member 20 and the outer peripheral surface of the cylindrical part 11. This annular space 27 is formed at the lower part of the screw part 15 so as to surround the outer peripheral surface of the cylindrical part 11.

The annular weight 22 includes, as shown in FIGS. 3(a) and 3(b), a lower end surface 22a and an upper end surface 22b opposite to each other. The lower end surface 22a is contacted to the annular second insulating sheet 24, and the upper end surface 22b is contacted to the pressure fastening member 30. As shown in FIGS. 3(a) and 3(b), two communicating passages 22A and 22B are formed in the lower end surface 22a of the annular weight 22.

The center axis of the annular weight 22 coincides with the axial line L—L, and each of the two communicating passages 22A and 22B is extended in a diameter direction with respect to the center axis of the annular weight 22, and connects the inner periphery and the outer periphery of the annular weight 22. The two communicating passages 22A and 22B are disposed at positions separate from each other by 180 degrees with respect to the center axis of the annular weight 22, and especially as shown in FIG. 2, these communicating passages 22A and 22B are positioned on a passage line P—P in a diameter direction orthogonal to the center axis of the annular weight 22.

The two communicating passages 22A and 22B are used as passages for injecting resin material instituting the resin mold member 40 into the annular space 27 between the annular combination member 20 and the cylindrical part 11. Only the two communicating passages 22A and 22B are provided for the annular weight 22. The resin material constituting the resin mold member 40 is injected into the annular space 27 through only the two communicating passages 22A and 22B.

Each of the two communicating passages 22A and 22B has a rectangular passage section, and has a specified width W and depth H. In the annular weight 22, as the result of the formation of the communicating passages 22A and 22B, its weight corresponding to the volume of the communicating passages 22A and 22B is decreased. However, since only the two communicating passages 22A and 22B are provided, as compared with a case where more communicating passages 22A and 22B are formed, a weight decrease in the weight 22 is suppressed, and a desired weight can be ensured for the weight 22.

Since only the two communicating passages 22A and 22B are formed, as compared with the case where more communicating passages are formed, while the weight decrease in the weight 22 is suppressed, the passage section can be made larger. Since the passage section becomes an injection passage section for the resin material for the resin mold member 40, when the passage section is made larger, the resin injection passage section for the resin material for the mold member 40 becomes large, and a sufficient amount of resin material can be injected into the annular space 27. In addition, since the two communicating passages 22A and 22B are disposed at the positions separate from each other by 180 degrees with respect to the center axis of the annular weight 22, the resin material for the mold member 40 can be effectively injected from both sides of the annular space 27 opposite to each other.

The annular first and the second terminal plates 25 and 26 are respectively connected to leading terminals 28 and 29 disposed at one side of the cylindrical part 11. A not-shown plug is fitted to the leading terminals 28 and 29, and electric signals from the piezoelectric element 21 are extracted by the plug. The electric signals are supplied to a not-shown band filter. This band filter has a narrow passing band at a frequency corresponding to the knocking vibration of the applied internal combustion engine, and knocking is detected on the basis of the electric signal having passed through this band filter.

The pressure fastening member 30 includes the nut 31 and a washer 32. The washer 32 is contacted to the upper end surface 22b of the annular weight 22. The nut 31 is screwed to the screw part 15 of the outer periphery of the cylindrical part 11, so that, through the washer 32, the annular combination member 20 is pressed to the pressure contacting surface 16 of the flange part 12 and is fixed.

In the state where the annular combination member 20 is pressed and fixed to the pressure contacting surface 16 of the flange part 12 by the pressure fastening member 30, the resin material for the resin mold member 40 is injected using a metal mold die and is molded. At the time of the molding, an assembly in which the annular combination member 20 is pressed and fixed to the pressure contacting surface 16 by the pressure fastening member 30 is placed in the metal mold die, and resin material is injected. An injection direction of the resin material at a resin injection gate of the metal mold die is indicated by an arrow M of FIGS. 1 and 2.

The resin mold member 40 includes a base surrounding portion 41 and a leading terminal surrounding portion 44 as one body. The base surrounding portion 41 is the portion surrounding the base member 10, the annular combination member 20 and the pressure fastening member 30, and includes an outside surrounding portion 42 and a space filling portion 43. The outside surrounding portion 42 surrounds the outer peripheries of the cylindrical part 11, the flange part 12, the annular combination member 20, and the pressure fastening member 30, and is sealed hermetically by the outer peripheries of the engagement grooves 14 and 18. The space filling portion 43 is the portion filled in the annular space 27, and prevents whisker from the plating layer of the surface of the base member 10 from causing electrical damage to the annular first and second terminal plates 25 and 26.

The leading terminal surrounding portion 44 surrounds the leading terminals 28 and 29 while exposing part of the leading terminals 28 and 29, and forms an insertion portion 45 of a plug.

Here, in the embodiment 1, as shown in FIGS. 1 and 2, the tip end of the arrow M is positioned on the outer peripheral surface of the outside surrounding portion 42 positioned at the left of the annular weight 22, and the resin material is injected into the metal mold die from the position of the tip end of the arrow M. The direction of the arrow M is orthogonal to the axial line L—L, and is set in a direction toward the axial line L—L. The resin material is injected in the direction of the arrow M. Although a line P—P in a diameter direction is set in an arbitrary direction with respect to the arrow M, for example, in FIG. 2, the line is set in a direction inclined with respect to the arrow M by 45 degrees.

Figure 4:
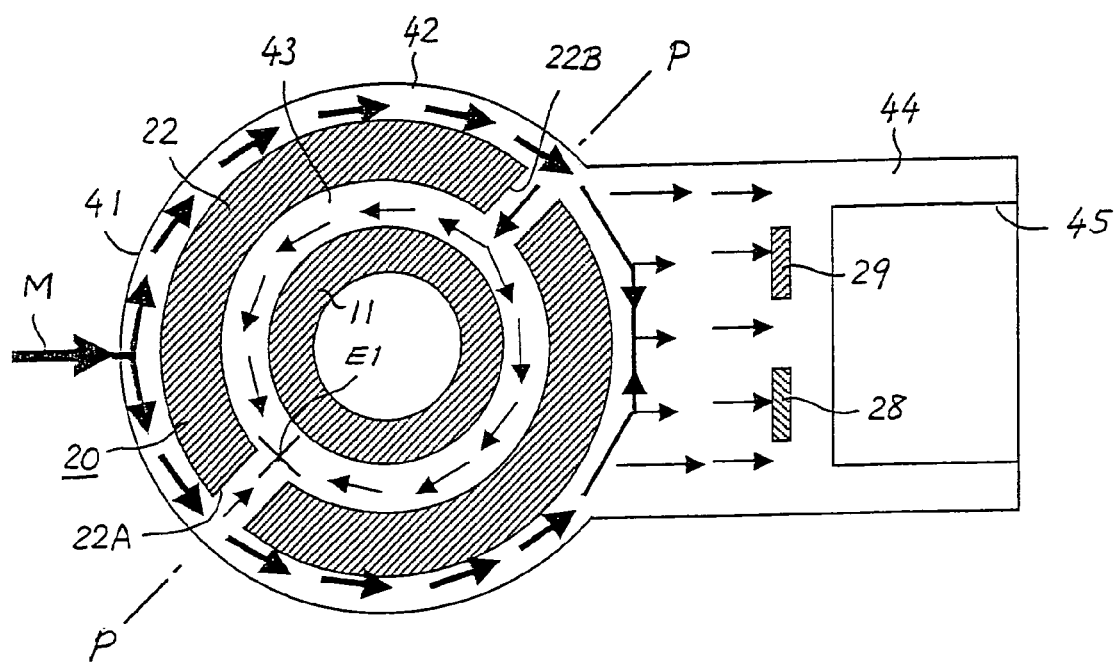
FIG. 4 is a sectional view showing a resin filling state for a resin mold member in the embodiment 1.

FIG. 4 shows a resin filling passage for the resin mold member 40 in this embodiment 1. Similarly to FIG. 2, in a section taken along line A—A of FIG. 1, FIG. 4 shows the resin filling passage for the resin mold member 40 by arrows. As indicated by the arrow M in FIG. 4, at the left part of the annular combination member 20, the flow of the resin material injected toward the right is divided into two parts. One of the flows of the resin material passes along the outer periphery of the upper half of the annular combination member 20 in FIG. 4, and fills the terminal surrounding portion 44 with the resin material. The other flow of the resin material passes along the outer periphery of the lower half of the annular combination member 20, and fills the terminal surrounding portion 44 with the resin material.

After filling of the resin material into the terminal surrounding portion 44 is completed, filling of the resin material into the base surrounding portion 41 is started. The base surrounding portion 41 includes the outer peripheral surrounding portion 42 and the space filling portion 43. The resin material is filled into the outer peripheral surrounding portion 42 through the resin passage formed on the outer periphery of the annular combination member 20, and the resin material is filled into the space filling portion 43 through the communicating passages 22A and 22B. Since the resin passage at the outer periphery of the annular combination member 20 is long in the direction along the axial line L—L, as compared with the resin passage in the communicating passages 22A and 22B, its sectional area is large. Thus, in the base surrounding portion 41, the resin material is first filled into the outer periphery surrounding portion 42, and after filling of the resin material into the outer peripheral surrounding portion 42 is almost completed, filling of the resin material into the space filling portion 43 is started.

In the embodiment 1, the passage line P—P where the communicating passages 22A and 22B are positioned is inclined by 45 degrees with respect to the arrow M, and the communicating passage 22B is close to the terminal surrounding portion 44 as compared with the communicating passage 22A. Thus, filling of the resin material into the space filling portion 43 is started from the communicating passage 22B, and a final resin arrival point E1 is close to the communicating passage 22A as indicated by mark X in FIG. 4. With respect to the final resin arrival point E1 in this space filling portion 43, since the filling passage from the filling start point of the resin in the space filling portion 43, that is, the communicating passage 22B is relatively long, a time T1 from the start of filling of the resin material into the space filling portion 43 to the arrival of the resin to the final resin arrival point E1 is relatively long.

In the relatively long time T1, the temperature of the resin material filled in the space filling portion 43 is also lowered. However, in the embodiment 1, as the result that only the two communicating passages 22A and 22B are formed, as compared with the case where more communicating passages are formed, the sectional area of each of the communicating passages 22A and 22B is increased, and the filling time of the resin material into the space filling portion 43 is shortened. Thus, filling of a sufficient amount of resin material can be performed while the resin temperature is not lowered much.

As described above, in the embodiment 1, only the two communicating passages 22A and 22B are formed for the annular weight 22, and these communicating passages 22A and 22B are formed at the positions separate from each other by 180 degrees with respect to the center axis of the annular weight 22. Thus, as compared with the case where more communicating passages are formed, while the decrease of weight in the annular weight 22 is suppressed, the passage section is made large, the sufficient resin material for the resin mold member 40 can be injected into the annular space 27, and the electrical damage of the terminal plates 25 and 26 by whisker from the plating layer of the base member 10 can be more certainly prevented.

Embodiment 2

In embodiment 2 of a knocking sensor for an internal combustion engine according to the invention, a passage line P—P where only two communicating passages 22A and 22B separate from each other by 180 degrees are positioned is disposed in parallel to or almost in parallel to an arrow M. The others are constructed in the same way as the embodiment 1. Same portions as those of the embodiment 1 are denoted by the same symbols.

Figure 5:
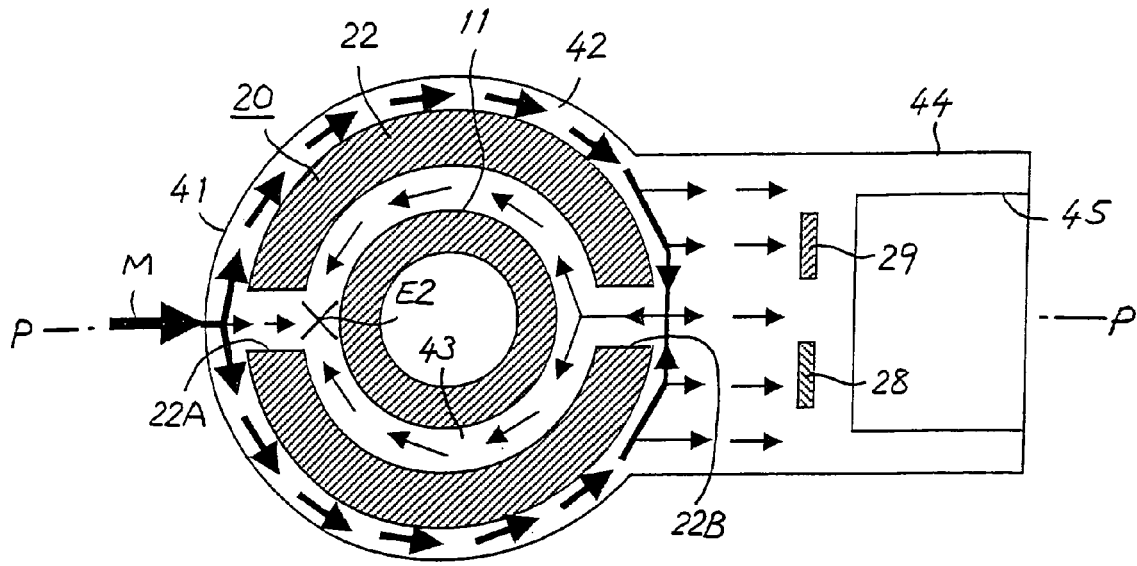
FIG. 5 is a sectional view showing a resin filling state for a resin mold member in embodiment 2.

FIG. 5 shows a resin filling passage for a resin mold member 40 in this embodiment 2. Also in this embodiment 2, similarly to the embodiment 1, filling of resin material into a terminal surrounding portion 44 is completed, and then, after filling of resin material into an outer peripheral surrounding portion 42 is almost completed, filling of resin material into a space filling portion 43 is started. The filling of the resin material into the space filling portion 43 is also started from the communicating passage 22B similarly to the embodiment 1, and a final resin arrival point E2 becomes close to the communicating passage 22A as shown in FIG. 5.

However, in the embodiment 2, as compared with the embodiment 1, the communicating passage 22A is closest to the arrow M, and the communicating passage 22B is closest to the terminal surrounding portion 44. Thus, since the filling passage of the resin material into the space filling portion 43 becomes short as compared with the embodiment 1, the filling of the resin material into the space filling portion 43 is facilitated, the filling of the resin material into the space filling portion 43 can be completed at an earlier time, and as compared with the embodiment 1, the filling of the resin material can be effectively performed in a period of time when the lowering of the resin temperature is small.

Embodiment 3

Figure 6:
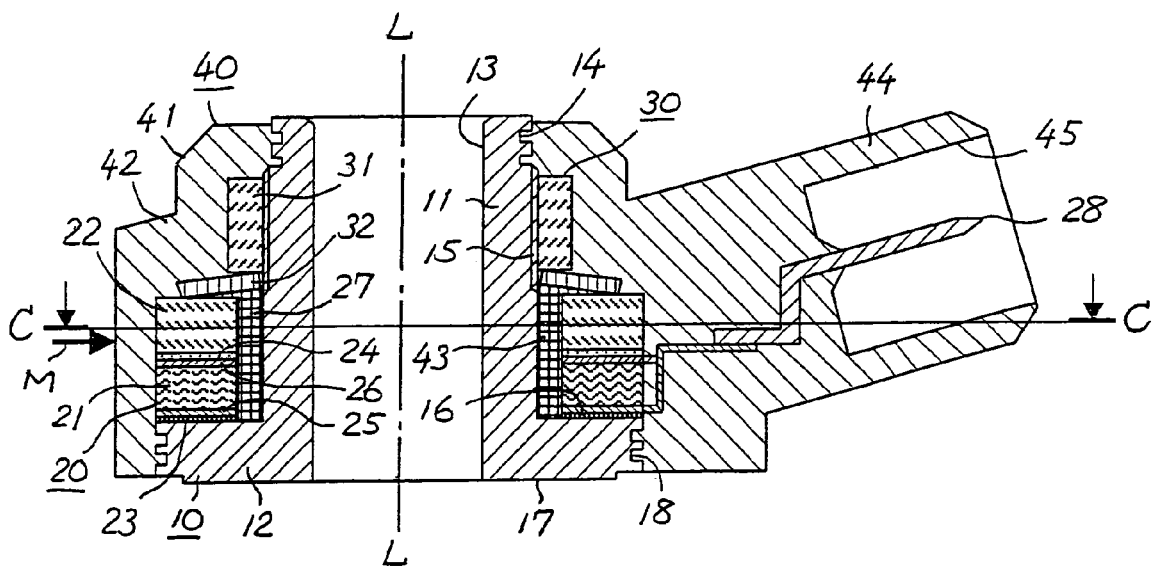
FIG. 6 is a longitudinal sectional view showing embodiment 3 of a knocking sensor for an internal combustion engine according to the invention.
Figure 7:
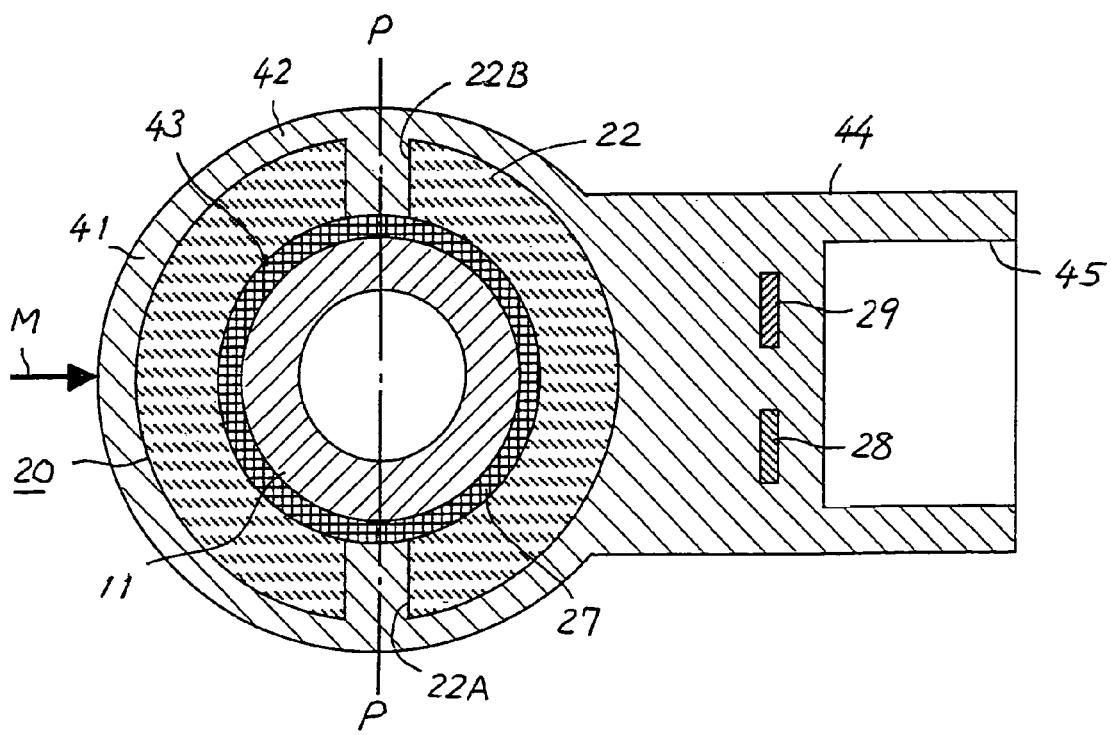
FIG. 7 is a sectional view taken along line C—C of FIG. 6.

FIG. 6 shows embodiment 3 of a knocking sensor for an internal combustion engine according to the invention, and FIG. 7 is a sectional view taken along line C—C of FIG. 6. In the embodiment 3, as compared with the embodiment 1, a passage line P—P where two communicating passages 22A and 22B are disposed is constructed to be orthogonal to or almost orthogonal to an arrow M. The others are constructed in the same way as the embodiment 1. Same portions as those of the embodiment 1 are denoted by the same symbols.

Figure 8:
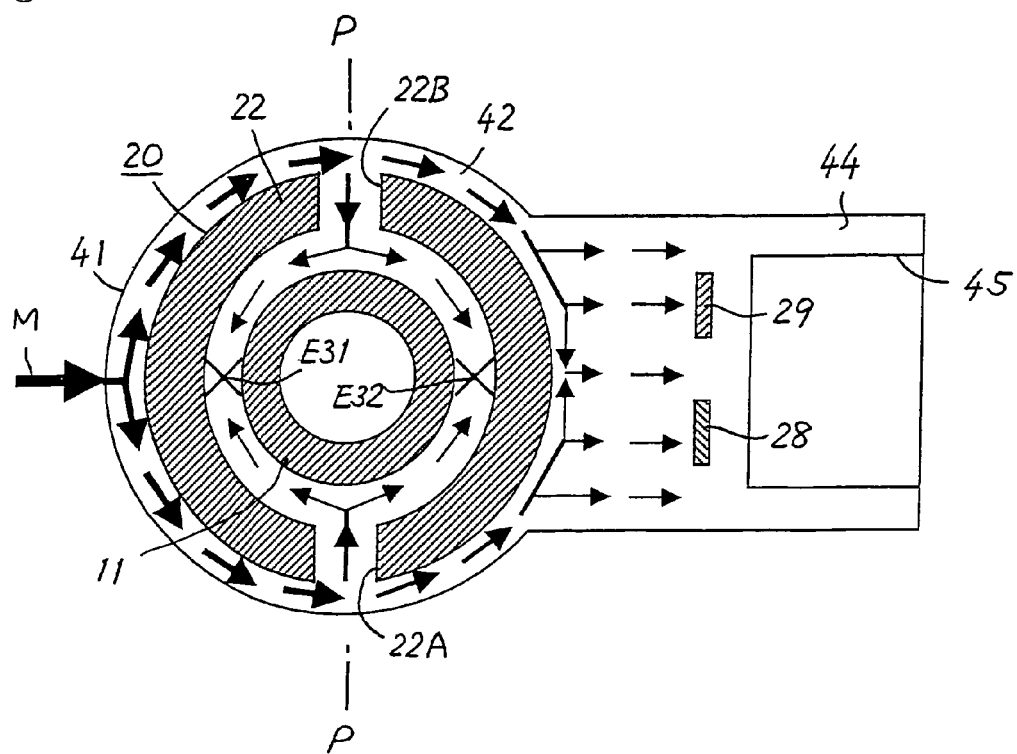
FIG. 8 is a sectional view showing a resin filling state for a resin mold member in the embodiment 3.

FIG. 8 shows a filling passage for a resin mold member 40 in the embodiment 3. Similarly to FIG. 7, FIG. 8 shows the filling passage of the resin material for the resin mold member 40 by arrows in a section taken along line C—C of FIG. 6. Also in the embodiment 3, after filling of resin material into a terminal surrounding portion 44 is completed, filling of resin material into an outer peripheral surrounding portion 42 is almost completed, and then, filling of resin material into a space filling portion 43 is started. In the embodiment 3, the filling of the resin material into the space filling portion 43 is started from the two communicating passages 22A and 22B, and two final resin arrival points E31 and E32 are formed, and as compared with the embodiments 1 and 2, the filling passage of the resin material in the space filling portion 43 can be shortened.

Specifically, in the embodiment 3, lengths of the resin filling passages from the arrow M to the two communicating passages 22A and 22B are equal to each other, and lengths of the resin filling passages between the terminal surrounding portion 44 and the two communicating passages 22A and 22B are also equal to each other. Thus, the communicating passages 22A and 22B are put in the same condition, and when the filling of the resin material into the outer peripheral surrounding portion 42 is almost completed, the filling of the resin material into the space filling portion 43 is started from both of the communicating passages 22A and 22B at the same time.

As the result of this, the final resin arrival points E31 and E32 are formed at just the centers of the two communicating passages 22A and 22B. In FIG. 8, the final resin arrival point E31 is formed in the left half of the space filling portion 43, and the final resin arrival point E32 is formed in the right half. As a result, in the embodiment 3, the lengths of the resin filling passages from the filling start points of the resin material into the space filling portion 43, that is, from the communicating passages 22A and 22B to the final resin arrival points E31 and E32 become shortest, the resin material can be filled in the space filling portion 43 in a short time, and as compared with the embodiments 1 and 2, in a state where the resin temperature is not lowered, most effective resin material filling can be performed.

Embodiment 4

Figure 9:
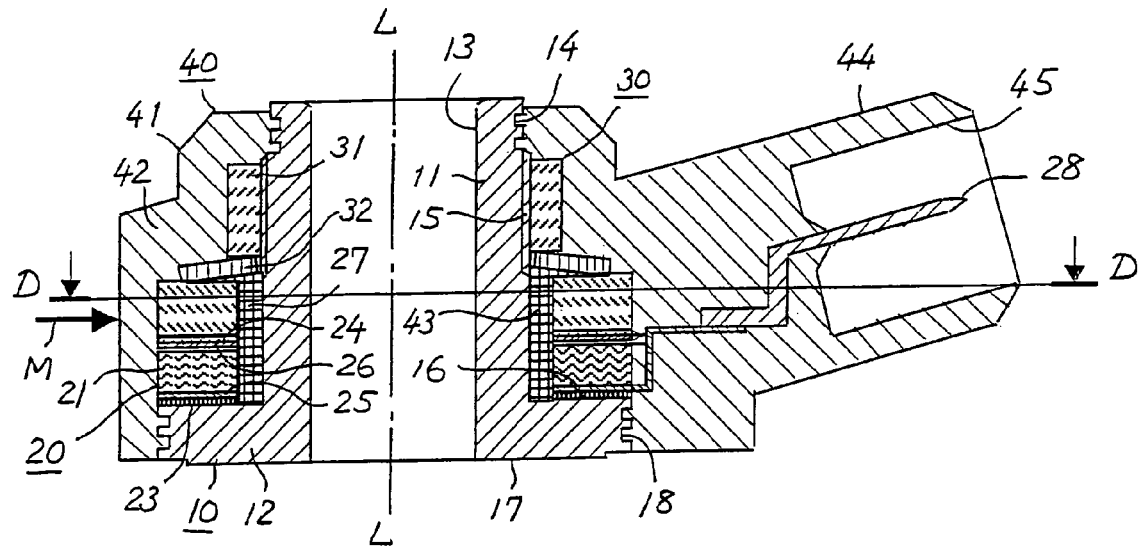
FIG. 9 is a longitudinal sectional view showing embodiment 4 of a knocking sensor for an internal combustion engine according to the invention.
Figure 10:
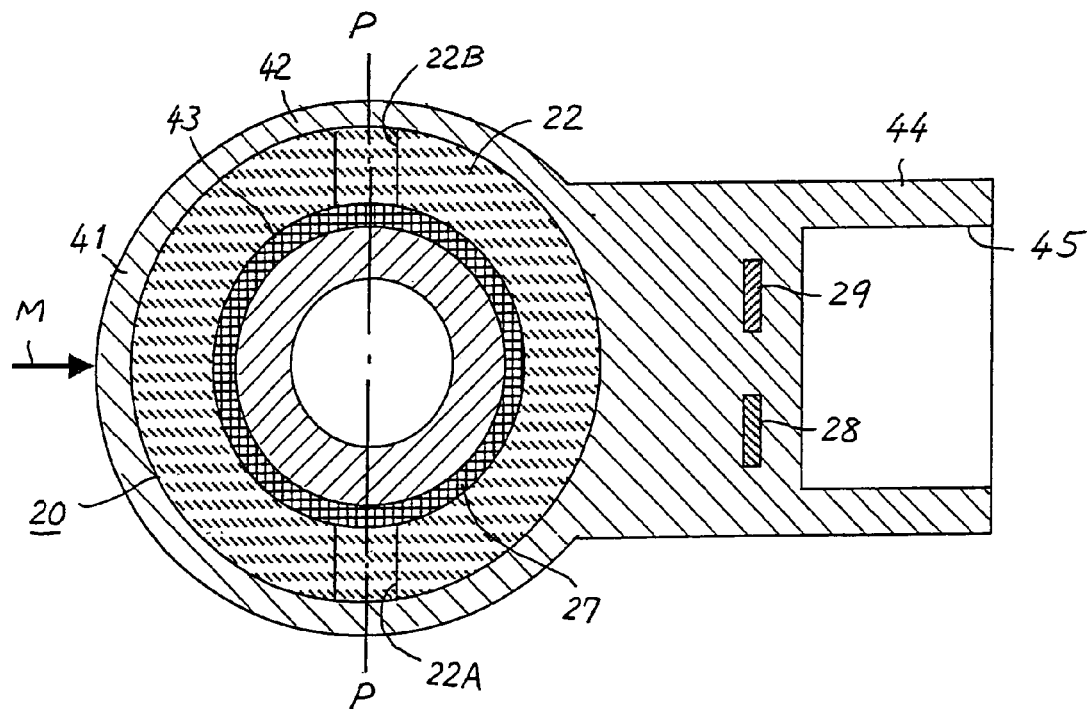
FIG. 10 is a sectional view taken along line D—D of FIG. 9.

FIG. 9 is a sectional view showing embodiment 4 of a knocking sensor for an internal combustion engine according to the invention, and FIG. 10 is a sectional view taken along line D—D FIG. 9. In the embodiment 4, only two communicating passages 22A and 22B separate from each other by 180 degrees are formed on an upper surface 22b of an annular weight 22. The others are constructed in the same way as the embodiment 3. Same portions as those of the embodiment 3 are denoted by the same symbols. A passage line P—P where the two communicating passages 22A and 22B are positioned is disposed to be orthogonal to or almost orthogonal to an arrow M.

In this embodiment 4, since the two communicating passages 22A and 22B are formed on the upper surface 22b of the annular weight 22, that is, the upper surface 22b opposite to a pressure fastening member 30, a lower surface 22a of the annular weight 22, that is, the lower surface 22a opposite to an annular piezoelectric element 21 does not have the communicating passages 22A and 22B, and is formed to be flat. The flat lower surface 22a is brought into press contact with the annular piezoelectric element 21 through an annular second insulating sheet 24 and an annular second terminal plate 26 by the pressure fastening member 30.

In the embodiment 4, the passage line P—P where the two communicating passages 22A and 22B are positioned is disposed in the direction orthogonal to the arrow M, and similarly to the embodiment 3, the filling of resin into a space filling portion 43 is effectively performed from the communicating passages 22A and 22B to final resin arrival points E31 and E32 at the same time, and electrical damage in the terminal plates 25 and 26 can be certainly prevented. In addition, the communicating passages 22A and 22B are formed on the upper surface 22b of the annular weight 22, and vibration amplified with a wide area can be effectively given to the annular piezoelectric element 21 by using the flat lower surface 22a.

Embodiment 5

Embodiment 5 relates to a manufacturing method of manufacturing a knocking sensor for an internal combustion engine according to the embodiments 3 and 4. The manufacturing method of manufacturing the embodiment 3 includes a pressure fastening step in which in the state where the annular combination member 20 is fitted on the outer periphery of the cylindrical part 11 of the base member 10, the washer 32 of the pressure fastening member 30 is fitted on the cylindrical part 11, and then, the nut 31 of the pressure fastening member 30 is screwed onto the screw part 15 of the cylindrical part 11 to press the annular combination member 20.

Figure 11:
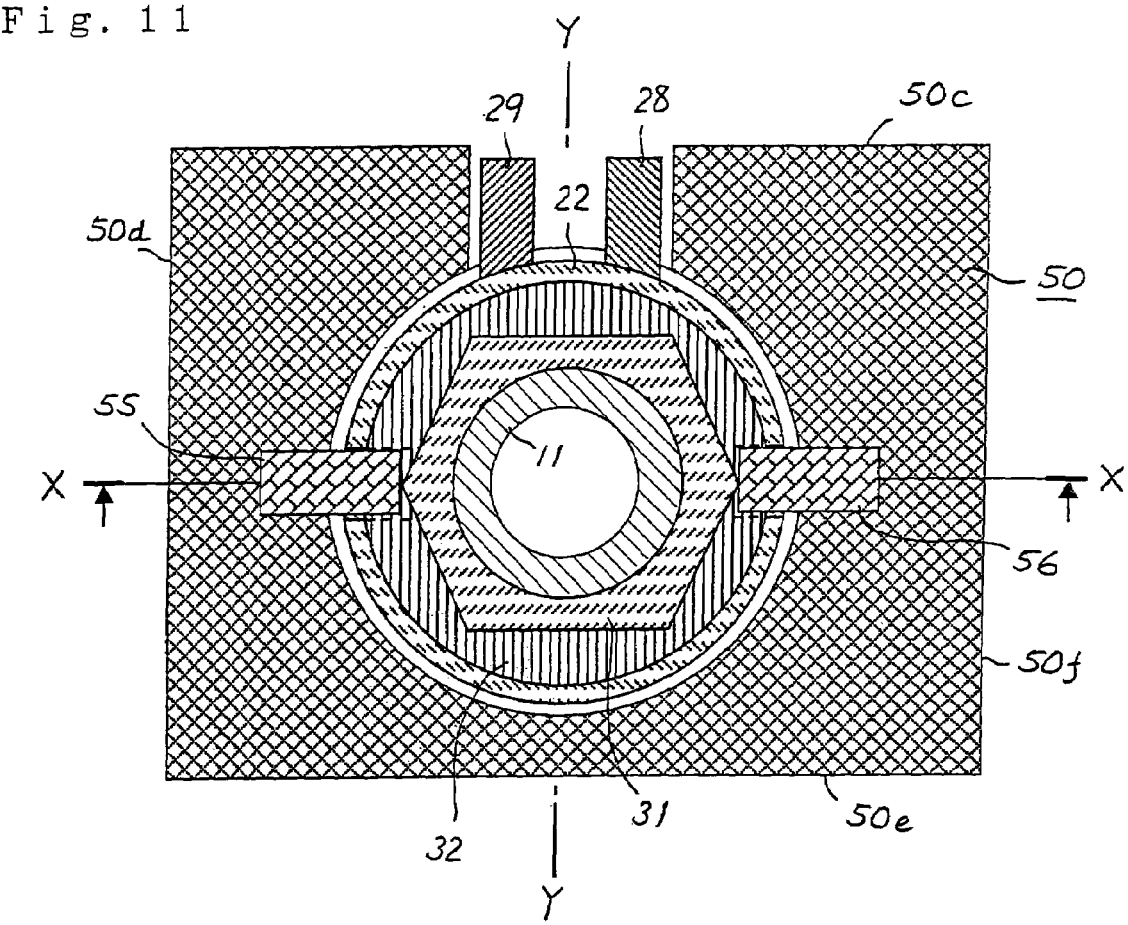
FIG. 11 is a cross-sectional view showing a jig used in a manufacturing method of a knocking sensor for an internal combustion engine according to the invention, together with the knocking sensor under manufacture.
Figure 12:
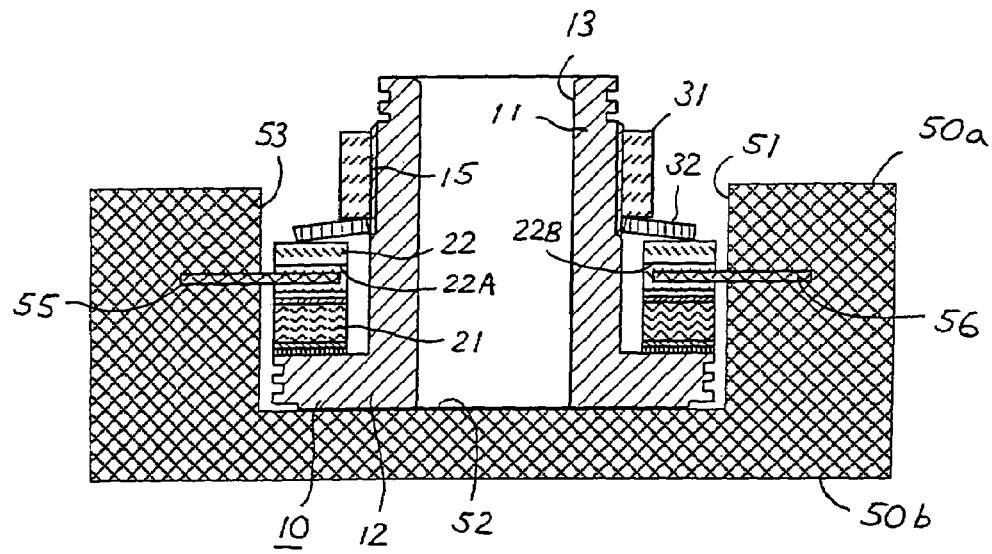
FIG. 12 is a sectional view taken along line X—X of FIG. 11.

In the embodiment 5, an improved jig 50 is used in this pressure fastening step. FIG. 11 is a sectional view showing the jig 50 and the knocking sensor under manufacture held by the jig 50, and FIG. 12 is a sectional view taken along line X—X of FIG. 11. Although FIGS. 11 and 12 show the jig 50 used for the embodiment 3 using the annular weight 22 having the communicating passages 22A and 22B on the lower end surface 22a, the same jig 50 is used also for the embodiment 4 in which the communicating passages 22A and 22B are formed on the upper end surface 22b.

The jig 50 shown in FIGS. 11 and 12 locks the annular weight 22 of the knocking sensor under manufacture in the pressure fastening step, and holds the knocking sensor under manufacture. In this pressure fastening step, with respect to the knocking sensor, the annular combination member 20 is fitted onto the cylindrical part 11 of the base member 10, and the annular first insulating sheet 23 disposed at the lowest position of the annular combination member 20 is connected to the pressure contacting surface 16 of the flange part 12 of the base member 10. The annular weight 22 of the annular combination member 20 in this state is locked and held by the jig 50.

The jig 50 has a rectangular block shape, and includes an upper surface 50a and a lower surface 50b opposite to each other, and four end surfaces 50c to 50f. A circular holding hole 51 is formed at the center of the upper surface 50a. The holding hole 51 includes a flat circular bottom surface 52, a cylindrical surface 53 rising from the bottom surface 52, and an opening 54 formed by cutting off a portion between the cylindrical surface 53 and the end surface 50c. When a center axial line of the cylindrical surface 53 is made the z-axis of three-dimensional coordinates of x, y and z, the opening 54 is extended along the y-axis of the three-dimensional coordinates. This y-axis is indicated by line Y—Y in FIG. 11. The x-axis of the three-dimensional coordinates is indicated by line X—X in FIG. 11. Two slide pins 55 and 56 opposite to each other are disposed on the line X—X. These slide pins 55 and 56 are respectively disposed to be capable of sliding on the line X—X in the diameter direction of the cylindrical surface 53.

The knocking sensor in which the annular combination member 20 is fitted on the outer periphery of the cylindrical part 11 is received in the holding hole 51 in such a manner that the lower surface 17 of the flange part 12 is connected to the bottom surface 52 of the holding hole 51, and the pair of leading terminals 28 and 29 are positioned at the opening 54. After the knocking sensor is received in the holding hole 51, the annular combination member 20 is rotated around the cylindrical part 11, and the passage line P—P of the annular weight 22 is made coincident with the line X—X. In this state, the slide pins 55 and 56 mutually slide toward the opposite sides in the diameter direction, and protrude at the inner periphery of the holding hole 51. The slide pins 55 and 56 are respectively fitted in the two communicating passages 22A and 22B, and lock the annular weight 22 in this state.

The state in which the passage line P—P of the annular weight 22 coincides with the line X—X of FIG. 11 and the leading terminals 28 and 29 are extended in the direction of the line Y—Y corresponds to the embodiments 3 and 4. FIGS. 11 and 12 show the state in which the resin mold member 40 has not been formed. Since the resin injection for the resin mold member 40 is performed in the direction toward the center of the annular combination member 20 from the position opposite to the leading terminals 28 and 29 with respect to the annular combination member 20, the line X—X where the slide pins 55 and 56 are positioned is orthogonal to the resin injection direction, and this relation is the same as the relation between the passage axis P—P and the arrow M in the embodiments 3 and 4.

As stated above, in the state where the annular weight 22 is locked, the washer 32 of the pressure fastening member 30 is fitted onto the annular combination member 20, and the nut 31 is screwed to the screw part 15. As the nut 31 is screwed, parts except for the weight 22 of the annular combination member 20 are rotated, however, the annular weight 22 is locked by the slide pins 55 and 56 and is not rotated, and the relation in which the passage axis P—P is orthogonal to the arrow M is held.

When the pressure fastening step for pressure-fastening the annular combination member 20 is completed by the pressure fastening member 30, the knocking sensor is taken out from the jig 50, and the procedure proceeds to a mold step of forming the resin mold member 40.

As described above, according to the embodiment 5, in the pressure fastening step for pressure-fastening the annular combination member 20 by the pressure fastening member 30, the passage axis P—P in the annular weight 22 can be held at the specified position, specifically, at the position of the embodiments 3 and 4, and the knocking sensors of the embodiments 3 and 4 can be easily manufactured.

The knocking sensor of this invention can be attached to various internal combustion engines, for example, an internal combustion engine installed in a vehicle, and is used for detecting the knocking of the internal combustion engine.

What is claimed is:

1. A knocking sensor for an internal combustion engine, comprising:
    a base member including a cylindrical part and a flange part formed at its one end;
    an annular combination member including at least an annular piezoelectric element and an annular weight, and disposed at an outer periphery of the cylindrical part of the base member;
    a pressure fastening member for pressure-fastening the annular combination member to the flange part of the base member; and
    a resin mold member covering the annular combination member and the pressure fastening member,
    wherein an annular space is provided between the annular combination member and the cylindrical part of the base member,
    the resin mold member is filled also in the annular space,
    the annular weight has only two communicating passages extending in its diameter direction,
    the two communicating passages are disposed at positions separate from each other by substantially 180 degrees with respect to a center axis of the annular weight, and
    each of the two communicating passages connects an outer periphery of the annular weight and the annular space to make passage for filling the resin material into the annular space.

2. The knocking sensor for an internal combustion engine according to claim 1, wherein the annular weight is disposed so that each of the two communicating passages is substantially parallel to a resin injection direction in a resin injection gate at molding of the resin mold member.

3. The knocking sensor for an internal combustion engine according to claim 1, wherein the annular weight is disposed so that each of the two communicating passages is substantially orthogonal to a resin injection direction in a resin injection gate at molding of the resin mold member.

4. The knocking sensor for an internal combustion engine according to claim 1, wherein the annular combination member includes, in addition to the annular piezoelectric element and the annular weight, an annular first insulating sheet contacted to the flange part, an annular first terminal plate held between the annular first insulating sheet and the annular piezoelectric element, an annular second insulating sheet contacted to the annular weight, and an annular second terminal plate held between the annular second insulating sheet and the annular piezoelectric element, and the annular weight is held between the pressure fastening member and the annular second insulating sheet.

5. The knocking sensor for an internal combustion engine according to claim 4, wherein the two communicating passages are formed on an end surface of the annular weight at a side of the annular second insulating sheet.

6. The knocking sensor for an internal combustion engine according to claim 4, wherein the two communicating passages are formed on an end surface of the annular weight at a side of the pressure fastening member.

7. A manufacturing method of a knocking sensor for an internal combustion engine, the knocking sensor comprising:
   a base member including a cylindrical part and a flange part integrally formed at its one end;
   an annular combination member including at least an annular piezoelectric element and an annular weight, and disposed at an outer periphery of the cylindrical part of the base member;
   a pressure fastening member screwed onto the cylindrical part and for pressure-fastening the annular combination member to the flange part of the base member; and
   a resin mold member covering the annular combination member and the pressure fastening member,
   in which an annular space filled with the resin mold member is provided between the annular combination member and the cylindrical part of the base member, the annular weight has only two communicating passages extending in its diameter direction, and each of the communicating passages connects an outer periphery of the annular weight and the annular space to make passage for filling the resin material into the annular space,
   wherein when the pressure fastening member is screwed onto the cylindrical part, a jig for surrounding the annular combination member is used, the jig is provided with two slide pins, and the slide pins are fitted in the respective communicating passages of the annular weight to lock the annular weight.

8. The manufacturing method of the knocking sensor for an internal combustion engine according to claim 7, wherein the two communicating passages are formed at positions separate from each other by substantially 180 degrees with respect to a center axis of the annular weight, and the slide pins lock the annular weight at a position where each of the communicating passages is substantially orthogonal to a resin injection direction in a resin injection gate at molding of the resin mold member.

* * * * *